US010933537B1

(12) United States Patent
Polido et al.

(10) Patent No.: US 10,933,537 B1
(45) Date of Patent: Mar. 2, 2021

(54) END OF ARM TOOL INCLUDING FEEDBACK

(71) Applicant: Amazon Technologies, Inc., Seattle, WA (US)

(72) Inventors: Felipe De Arruda Camargo Polido, North Reading, MA (US); Noah Scott Wieckowski, Brookline, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/262,591

(22) Filed: Jan. 30, 2019

(51) Int. Cl.
| | |
|---|---|
| *B25J 15/06* | (2006.01) |
| *B25J 13/08* | (2006.01) |
| *B25J 9/16* | (2006.01) |
| *B65G 47/91* | (2006.01) |

(52) U.S. Cl.
CPC ......... *B25J 15/0683* (2013.01); *B25J 9/1656* (2013.01); *B25J 13/081* (2013.01); *B25J 15/0616* (2013.01); *B65G 47/912* (2013.01)

(58) Field of Classification Search
CPC ............... B25J 15/0616; B25J 15/0625; B25J 15/0683; B25J 13/08; B25J 13/081; B25J 13/084; B25J 9/1656; B25J 9/1694; B65G 47/912; B65G 47/917; B65G 47/918; B66C 1/0237; B66C 1/0243
USPC .................................. 294/183, 184, 188, 65
See application file for complete search history.

(56) References Cited

U.S. PATENT DOCUMENTS

| | | | | | |
|---|---|---|---|---|---|
| 5,427,363 | A | * | 6/1995 | Rink | ..................... B23B 31/307 269/21 |
| 6,131,973 | A | * | 10/2000 | Trudeau | ............... B25J 15/0616 294/186 |
| 6,467,824 | B2 | * | 10/2002 | Bolotin | ............... H01L 21/6838 29/743 |
| 6,860,534 | B2 | * | 3/2005 | Vogel | ................... B65G 47/918 294/188 |
| 7,029,046 | B2 | * | 4/2006 | Lim | ........................ B23Q 5/40 294/188 |
| 7,281,739 | B2 | * | 10/2007 | Kniss | ..................... B25J 13/086 294/65 |
| 8,550,523 | B2 | * | 10/2013 | Rachkov | ............ H05K 13/0413 294/183 |
| 8,684,418 | B2 | * | 4/2014 | Lin | ...................... B25J 15/0061 269/21 |
| 8,944,481 | B2 | * | 2/2015 | Collado Jimenez | ........................ B25J 15/0061 294/185 |
| 9,656,813 | B2 | * | 5/2017 | Dunkmann | ............ B65G 47/91 |
| 9,982,691 | B2 | * | 5/2018 | Girtman | .............. F15B 15/1457 |
| 2013/0148076 | A1 | * | 6/2013 | Straub | ................ B29D 11/0024 351/159.01 |
| 2017/0073174 | A1 | * | 3/2017 | Tanaka | ................. B25J 15/0633 |

* cited by examiner

*Primary Examiner* — Dean J Kramer
(74) *Attorney, Agent, or Firm* — BakerHostetler

(57) ABSTRACT

An end-of-arm tool includes concentric rings of suction cup assemblies. Each suction cup assembly can be independently extended and retracted. Sensors on each suction cup assembly indicate its fully extended position such that displacement from the fully extended position upon contacting an item is indicated by the corresponding sensor.

18 Claims, 10 Drawing Sheets

END OF ARM TOOL INCLUDING FEEDBACK

BACKGROUND

The present invention relates to automation, and more particularly to tools for engaging and lifting items via vacuum suction cups.

The robotics field has developed many tools for engaging and lifting items at the end of an end effector. For example, end effectors sometimes employ suction cups for engaging a surface of an item and using a negative or suction pressure or vacuum to engage and lift the item.

Suction cup end-of-arm tools have some limitations, as the force created by the suction cup is limited by the magnitude of the negative pressure and suction cup area. In an environment in which many items of different shapes and sizes are expected to be encountered, a large suction cup may be blocked from the desired item by other items or the container in which the items may be located, or the item may be too small to engage the entire circumference of the suction cup. And a small suction cup may not be able to generate the force required to lift a heavier item.

Further, the cycle time for picking and placing in an automated system limits efficiency.

DETAILED DESCRIPTION OF ILLUSTRATIVE EMBODIMENTS

Figure 3:
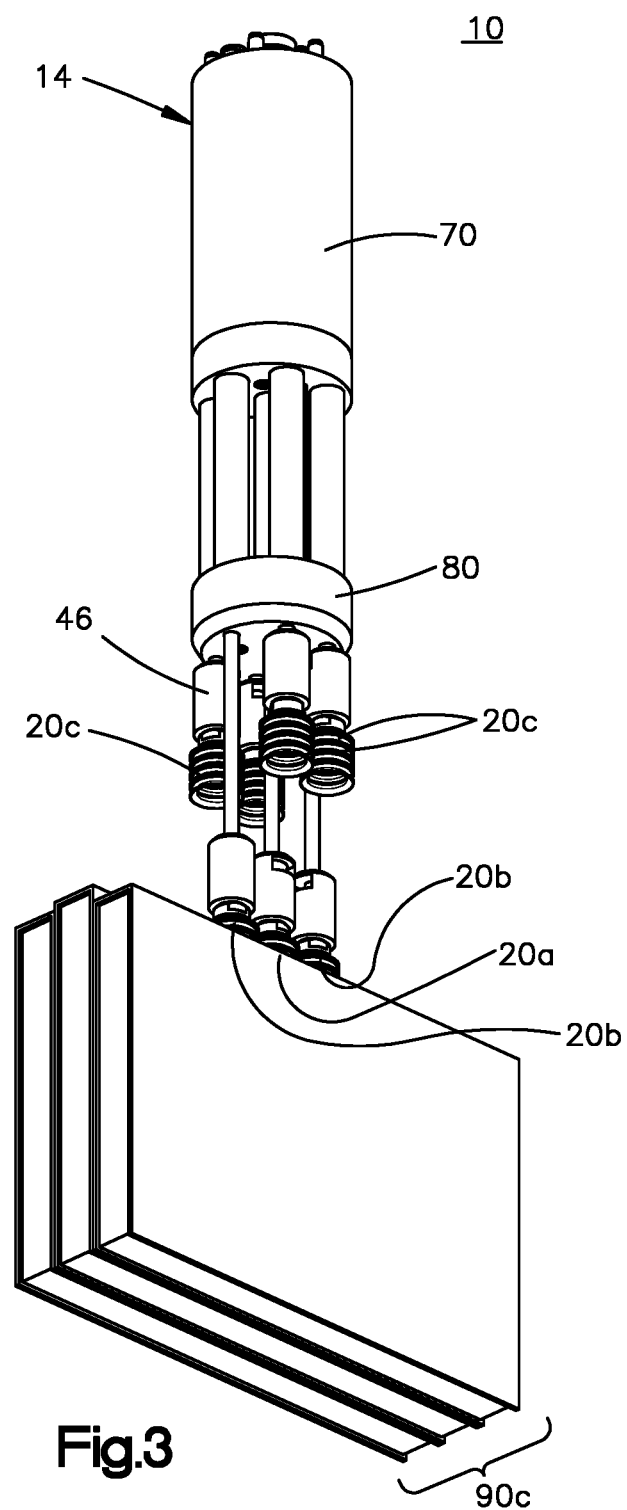
FIG. 3 is a perspective view of the tool of claim 1 with a line of suction cup assemblies deployed in the extended position.
Figure 4:
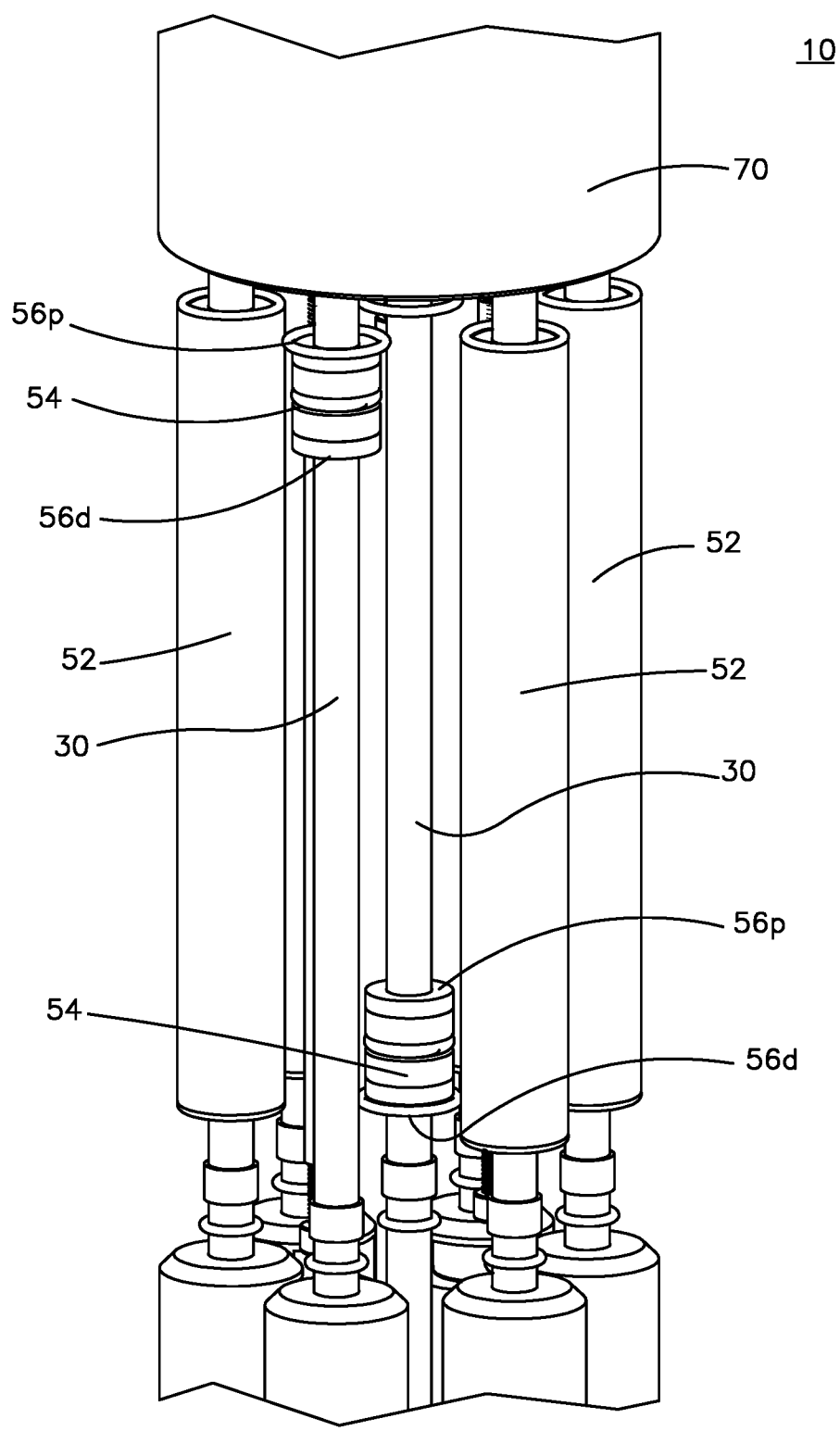
FIG. 4 is a view of a central portion of the tool with some of the piston housings removed for clarity to illustrate the center suction tube assembly in the deployed, extended position and one of the outer ring of suction cup assemblies in the retracted position.
Figure 5:
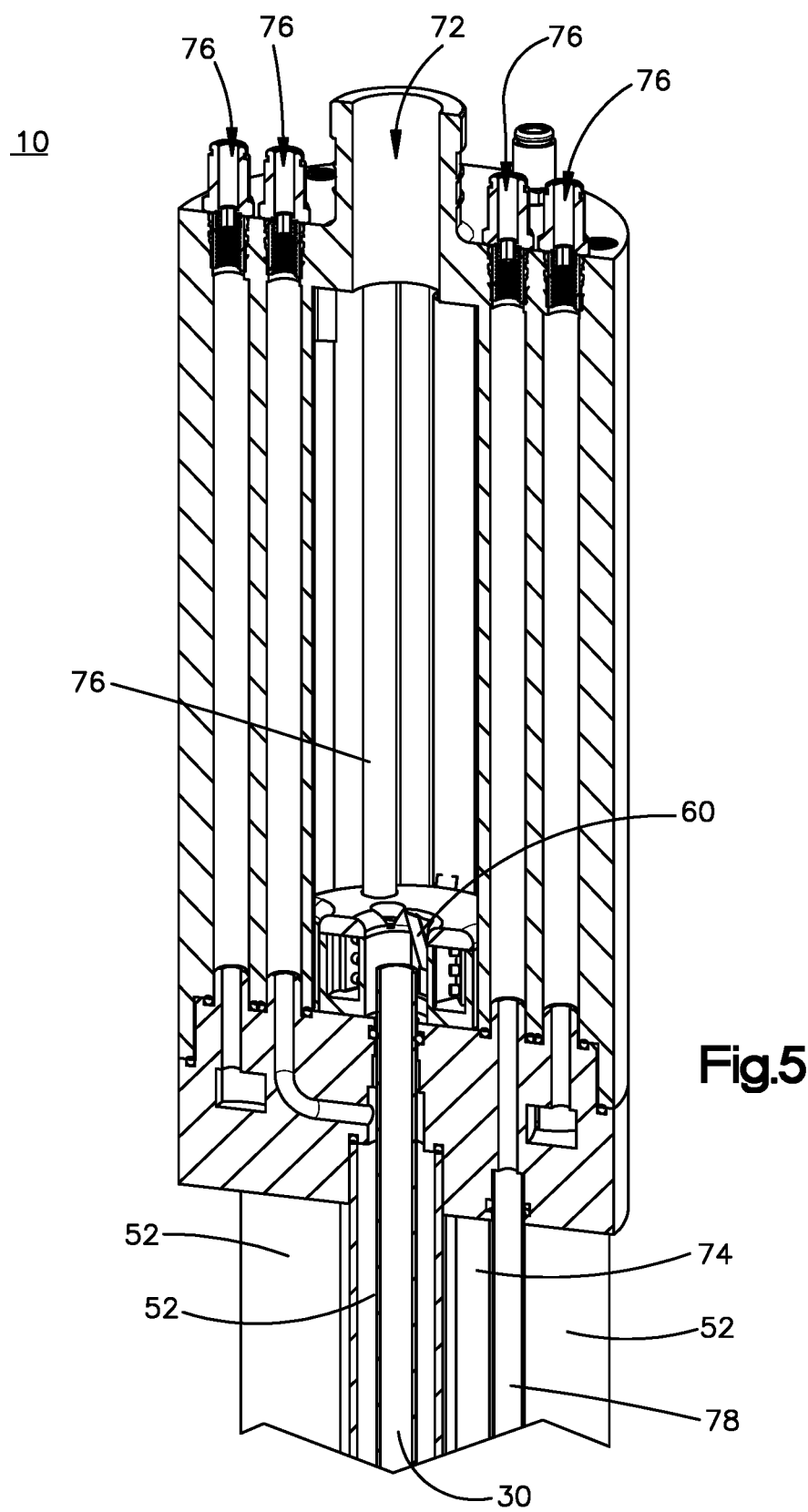
FIG. 5 is a view of the upper portion of the tool with all of the suction cup assemblies in the extended position, showing the limit switches in the extended position.
Figure 6:
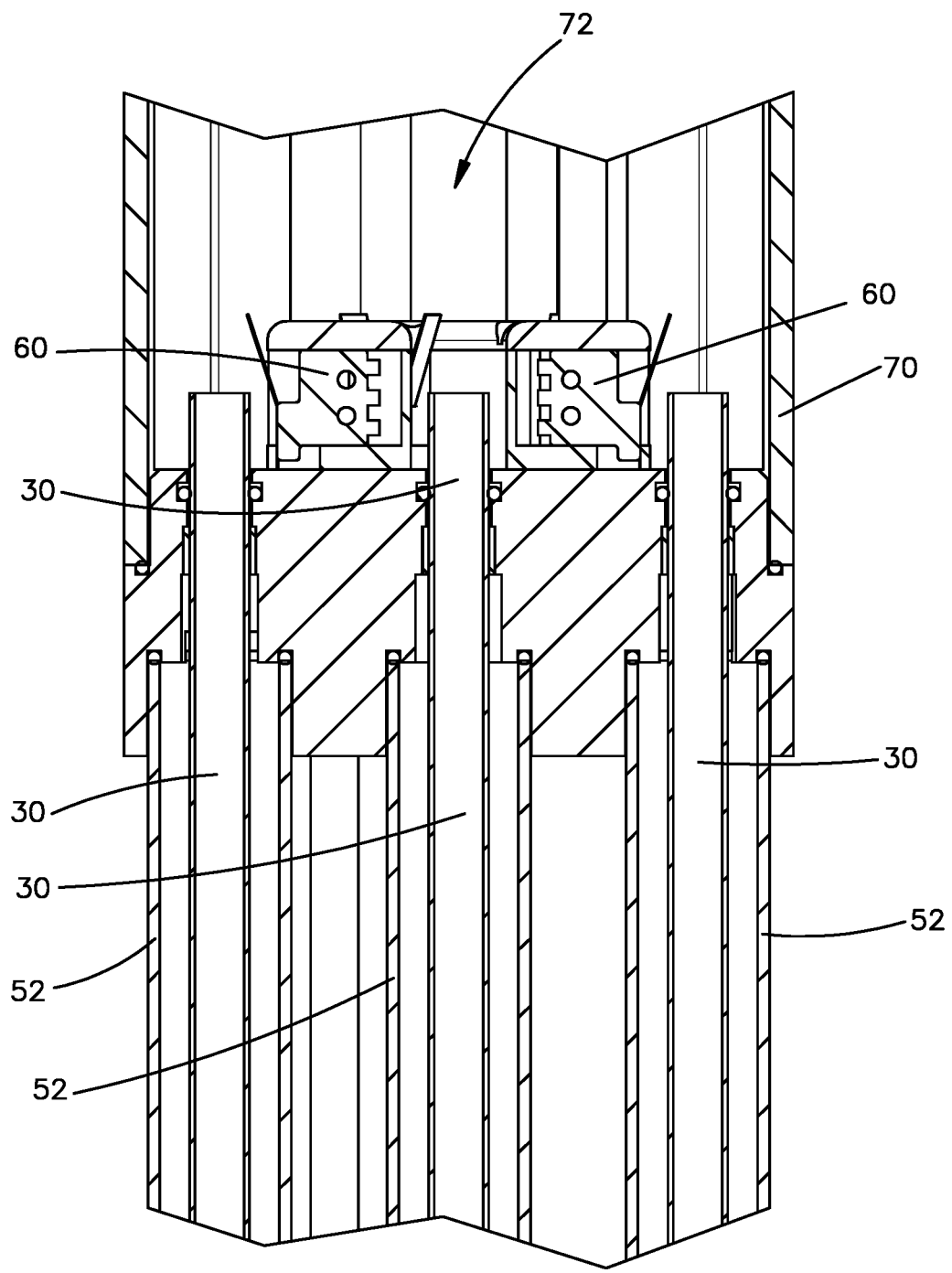
FIG. 6 is a view of the tool of FIG. 5 shown orthogonal to the view of FIG. 5.

And end-of-arm tool described herein can includes feedback upon the suction cup assembly contacting an item, which in some circumstances can be used in decrease cycle time for picking and placing an item and/or simplifying controls for an automated system. Further, the tool can include suction cup assemblies that are extended and retracted independently of other suction cup assemblies to enable extending the suction cup assemblies as needed to enhance lifting of the item. For example, suction cup assemblies oriented in a line can be extended to grasp an elongate item, as illustrated in FIG. 3. Or three adjacent suction cup assemblies can be extended to engage a triangular item (not shown in the figures), or any other combination of suction cup assemblies may be employed, as desired and as chosen by the control system, as explained more fully below.

The term "item" is used herein to broadly refer to any object, including without limitation a retail product in a fulfillment center, a mailer (such as a padded envelope and the like), a cardboard or like box, other packaging, a loose component such as in a manufacturing environment, and the like.

Feedback can be achieved in a suction cup assembly by a sensor, such as a limit switch or proximity sensor, positioned near a distal end of the tube of the suction cup assembly. When a suction cup assembly is in its fully extended position, and then encounters an item via movement of an arm (to which the tool is mounted), the suction cup assembly is displaced from the fully extended position, such as against the pneumatic pressure holding the suction cup assembly in its fully extended position. Upon the displacement, the sensor changes condition to send a signal to the control system indicating that the tool has engaged an item.

The longitudinal displacement of the suction cup assembly also promotes grasping, as suction cup assemblies displace to conform to, or approximately match of the shape of, the item being grasped. For example, for a cylindrical object or spherical object, opposing outboard suction cup assemblies can extend relative to inboard assemblies to approximately conform the cylinder or sphere. And the arrangement of suction cup assemblies can longitudinally deform in more complex ways when engaging an object with a more complex shape.

The suction cup assemblies can be arranged in a 2D-pattern, which refers to arrangement of the suction cup assemblies as viewed longitudinally from the distal end. In the embodiment of the figures, the 2D-pattern is a single, central suction cup assembly surrounded by a concentric ring of suction cup assemblies. Other arrangements of the 2D-pattern of suction cup assemblies may be used. For some non-limiting examples, additional concentric rings, rectangular grids, ovals and other asymmetrical arrangements, triangles and other polygons, of the suction cup assemblies may be employed. Further, the term "center suction cup assembly" may be more than one suction cup assembly (not shown in the figures).

In some configurations, the signal indicating contact of the suction cup with the item can be used with other sensor information, such as changes in vacuum pressure applied via the suction cup upon contact, proximity sensors, vision systems, and the like, to speed the engagement process to diminish cycle time of the tool (that is, the time for engaging and grasping an item, transporting it to a desired location, discharging the item from the tool, and returning to engage and grasp another item). For example, positive confirmation upon contact of the tool with the item can be helpful in controlling deceleration of the tool in some circumstances.

Figure 11:
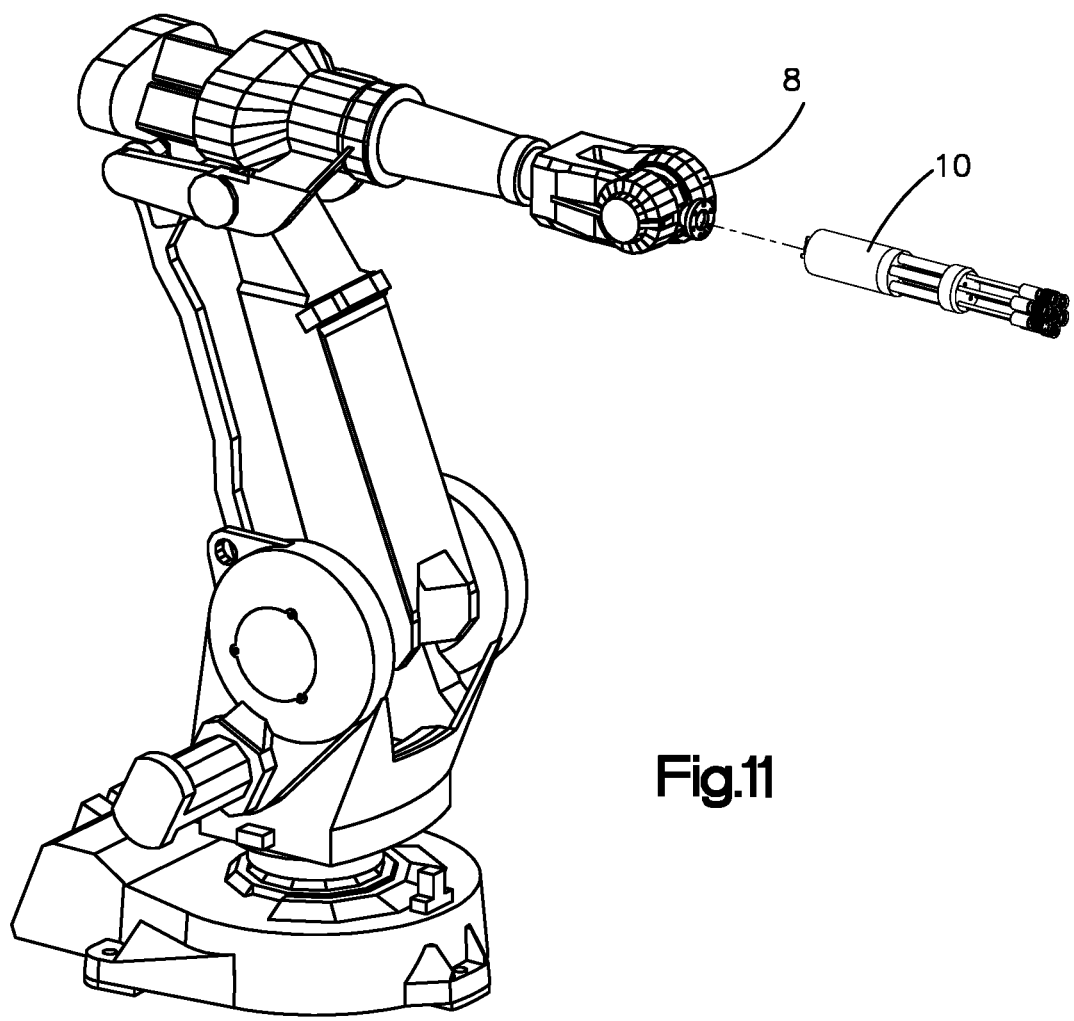
FIG. 11 is a view of a six-axis robot that may be used to position and move the tool.

Referring to the figures to illustrate an example or embodiment of a tool, an end-of-arm tool 10 is configured to be mounted to a robotic arm 8, as illustrated in FIG. 11. The arm 8 moves and positions tool 10 according to particular goals of the system, as will be understood by persons familiar with automated or robotic picking. A six axis robot is illustrated in FIG. 11, and the term "arm" can refer to any type of end effector, including without limitation a robotic arm, a gantry, and any other configuration capable of positioning the suction cup tool. The term end-of-arm" refers to the distal or working end of any kind of arm.

Tool 10 includes a housing 14 and suction cup assemblies 20 that are moveable relative to the housing. The suction cup assemblies are referred to be reference number 20 when addressing the structure and function of the suction cup assemblies in general or as a whole. Reference number 20a is used to refer to the center suction cup assembly. Reference number 20b is used to refer to opposing suction cups in the outer ring of suction cups. Reference number 20c is used to refer to the other four suction cup assemblies in the outer ring of suction cups.

Figure 1:
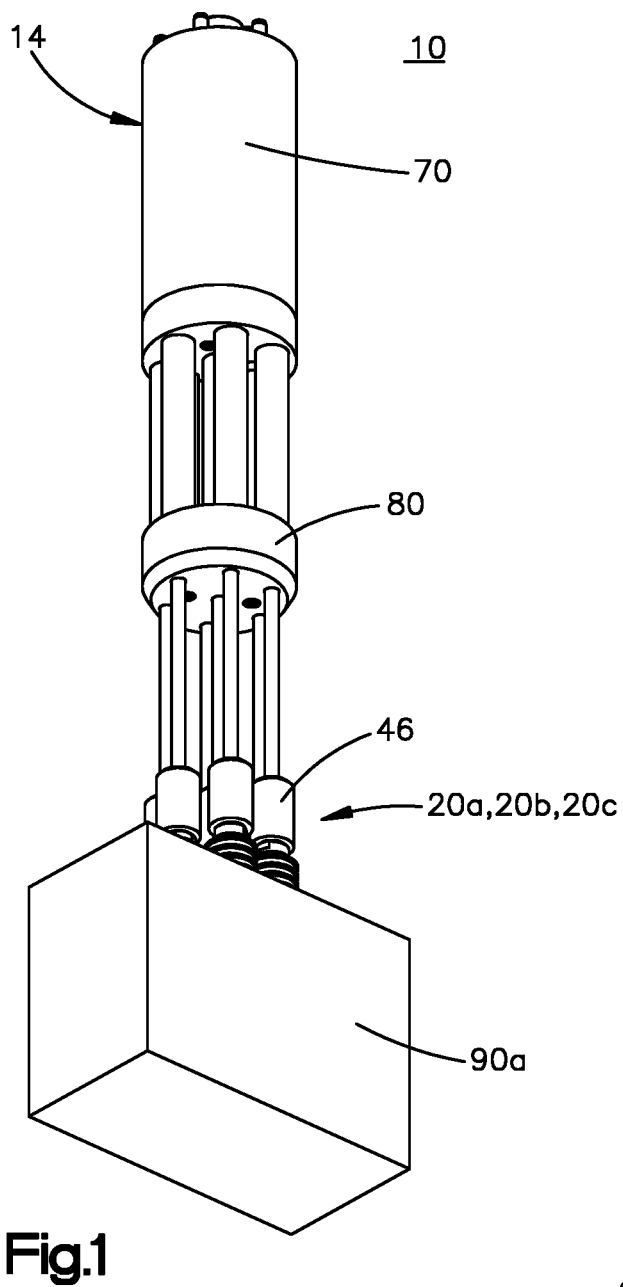
FIG. 1 is a perspective view of a tool embodiment illustrating aspects of the present disclosure with the suction cup assemblies in a fully extended configuration.
Figure 2:
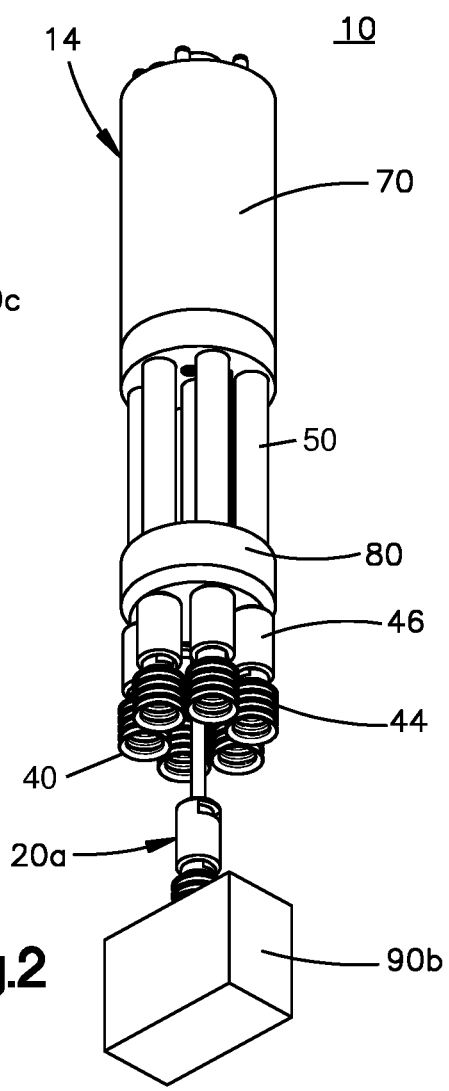
FIG. 2 is a perspective view of the tool of claim 1 with only the center suction cup assembly deployed in its extended position.

FIG. 1 illustrates tool 10 grasping a larger box 90a with all the suction cup assemblies 20a, 20b, and 20c extended to or near their fully extended positions. FIG. 2 illustrates tool 10 with only the center suction cup assembly 20 extended to grasp a smaller box 90b. The orientation of FIG. 2 may also be employed when an item intended to be grasped is in an inconvenient portion, such as in the corner or a tote or gaylord. The opposite of the orientation of FIG. 2—with the center suction cup assembly retracted and the suction cup assemblies 20b and 20c extended in a ring—may also be employed. FIG. 3 illustrates extension of suction cup assemblies 20a and 20b in a row, while the remaining suction cup assemblies 20c remain retracted.

Housing 14 includes a proximal portion 70 that forms a vacuum plenum 72, connecting rods 74, and pneumatic channels 76 and a distal block 80 that is connected to the proximal portion 70 by the connecting rods 74. Accordingly, distal block 80 is fixed relative to housing proximal portion 70. Housing portion 70 includes the pneumatic channel 76 for each one of the suction cup assemblies 20.

Each one of suction cup assemblies 20 includes a suction tube 30, a suction cup 40, and an actuator 50. Suction tube 30 extends from housing upper structure 70 and through distal block 80.

Actuator 50 in the embodiment of the figures is a hollow-shaft, dual-action pneumatic piston, including a piston housing or actuator tube 52 and a piston 54 that is coupled to suction tube 30 (that is, the hollow shaft). Actuator 50 can be an off-the-shelf actuator from any supplier, or one designed for the particular requirements for the use. Piston 54 is housed within actuator tube 52, which may also be referred to as a piston housing or a piston sleeve. Each actuator tube 52 is fixed between upper housing 70 and distal block 80. Actuator tube 52 is concentrically outside of suction tube 30. Actuator tube 52 contains pneumatic pressure on the outboard side of suction tube 30. Passages 76 provide pneumatic pressure (that is positive pressure or compressed air) to the proximal ends of actuator tubes 52.

The piston 54 includes seals, such as o-rings, that contact the inner surface of actuator tube 52 such that the assembly of suction tube 30 and piston 54 translate within actuator tube 52. Because the suction cup is affixed to the distal end of the suction tube 30, movement proximally and distally of the piston 54 extends and retracts the suction cup assembly 20. In this regard, positive air pressure on a proximal side 56p drives piston 54 distally to extend the suction cup assembly 20 and positive air pressure on a distal side 56d drives piston 54 proximally to retract the suction cup assembly 20.

Figure 8:
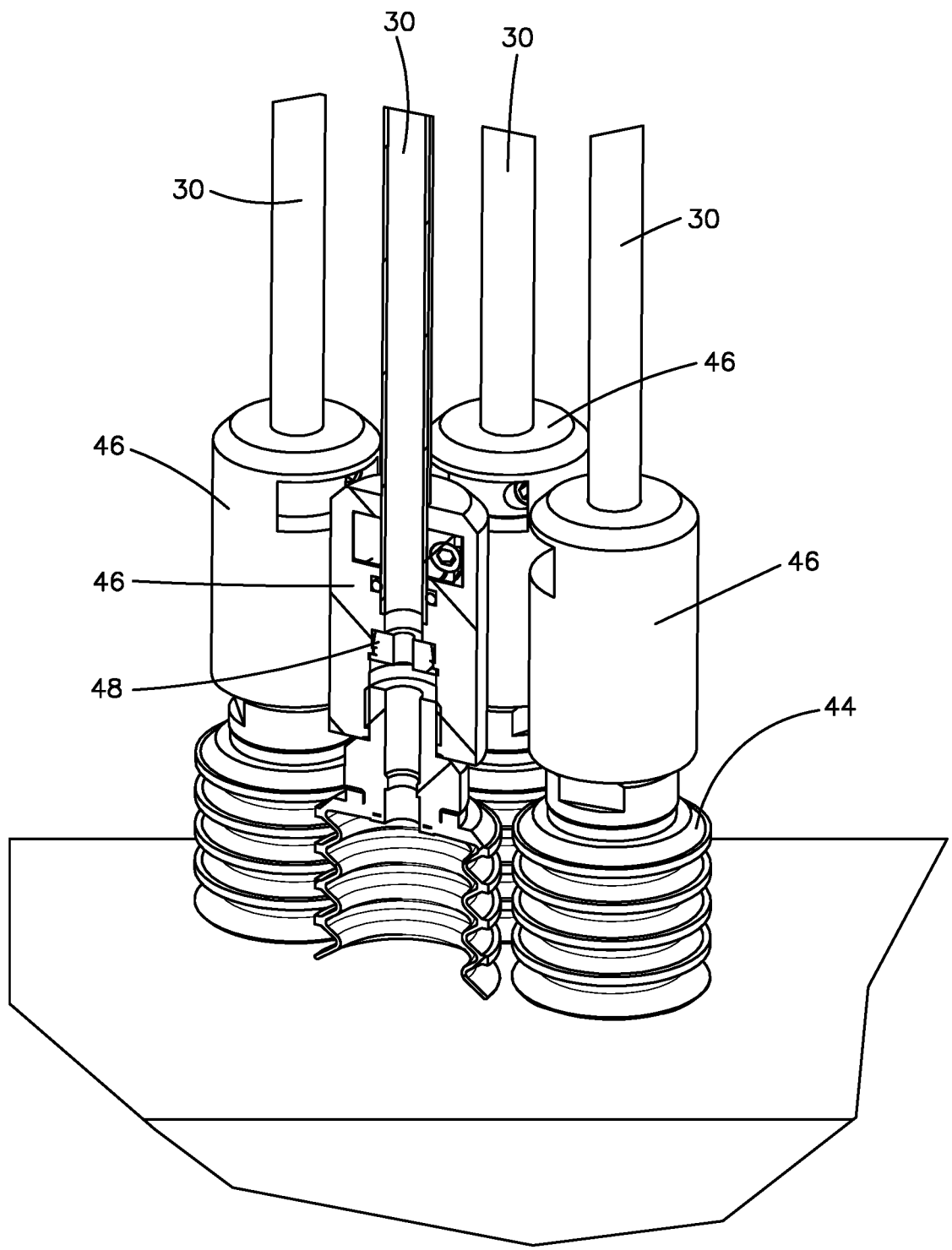
FIG. 8 is a view of the distal-most portion of the tool in cross section in the configuration of FIG. 1.

A suction cup 40 is affixed to the distal end of the corresponding suction tube 30. As best illustrated in FIG. 8, suction cup 40 includes a bellows 44 and a piston cap or housing 46. Housing 46 includes a channel to transmit vacuum pressure from the interior of the suction tube 30 to the interior of bellows 44. An aperture 48 is held in housing 46 and can be interchanged with apertures of various sizes to tune the vacuum supply to bellows 44.

In the example illustrated in the figures, the path of air flow induced by the vacuum pressure is unblocked from the bellows 44 through suction tube 30. Accordingly, the diameter of the aperture 48 (FIG. 9) may be chosen according to known principles relating to static pressure, air flow, response parameters upon contacting an item, leakage around an item when a good seal between the bellows and the item is not achieved, and the like.

Bellows 44 is formed of a compliant material (preferably conventional) to enable each suction cup, and the array of deployed suction cups in the extended position, to comply to the shape of the item. For example, a cylindrical or spherical item deform the bellows 44 and displace some of the suction cup assemblies.

Figure 7:
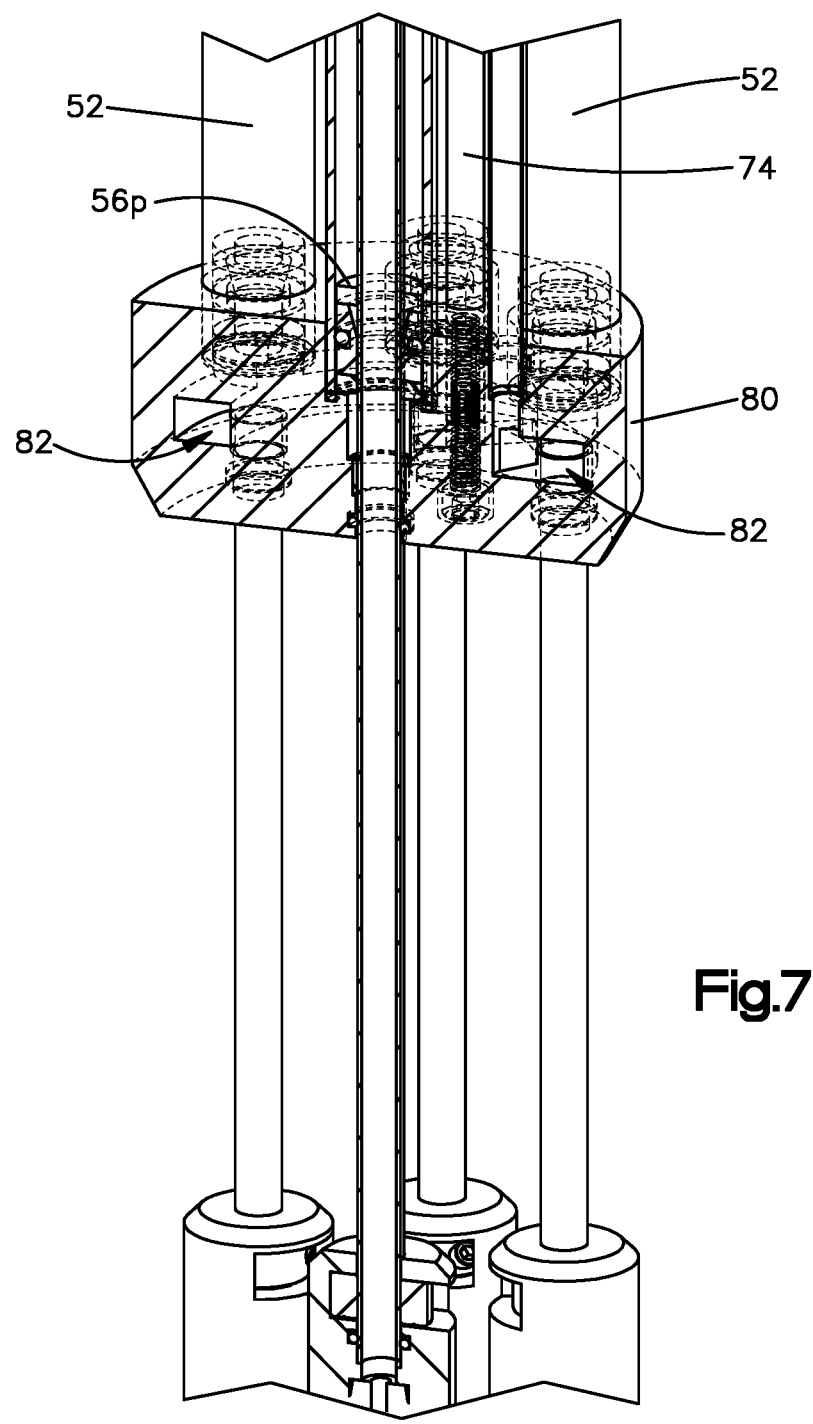
FIG. 7 is a cross-view of a lower portion of the tool, with a portion of the manifold block shown as transparent.

Distal block 80 includes a manifold 82, as best illustrated in FIG. 7, that connects distal ends of actuator tubes 52 together. A retract tube 78 extends from housing 70 to manifold 82 to provide pneumatic air to the distal side 56d of the piston. In the embodiment shown in the figures, pneumatic air is supplied distal ends of all the actuator tubes 52 simultaneously such that retraction of all the suction cup assemblies 20 that are extended occurs simultaneously.

Referring to FIGS. 5, 6, 9, and 10, an array of sensors 60 is located within housing 70 near the proximal ends of the suction tubes 30. A sensor block 62 holds the sensors 60 in place. In the embodiment of the figures, sensors 60 are electro-mechanical limit switches. Other sensors, such as a hall effect or other proximity sensor (for non-limiting example) may be employed.

Figure 9:
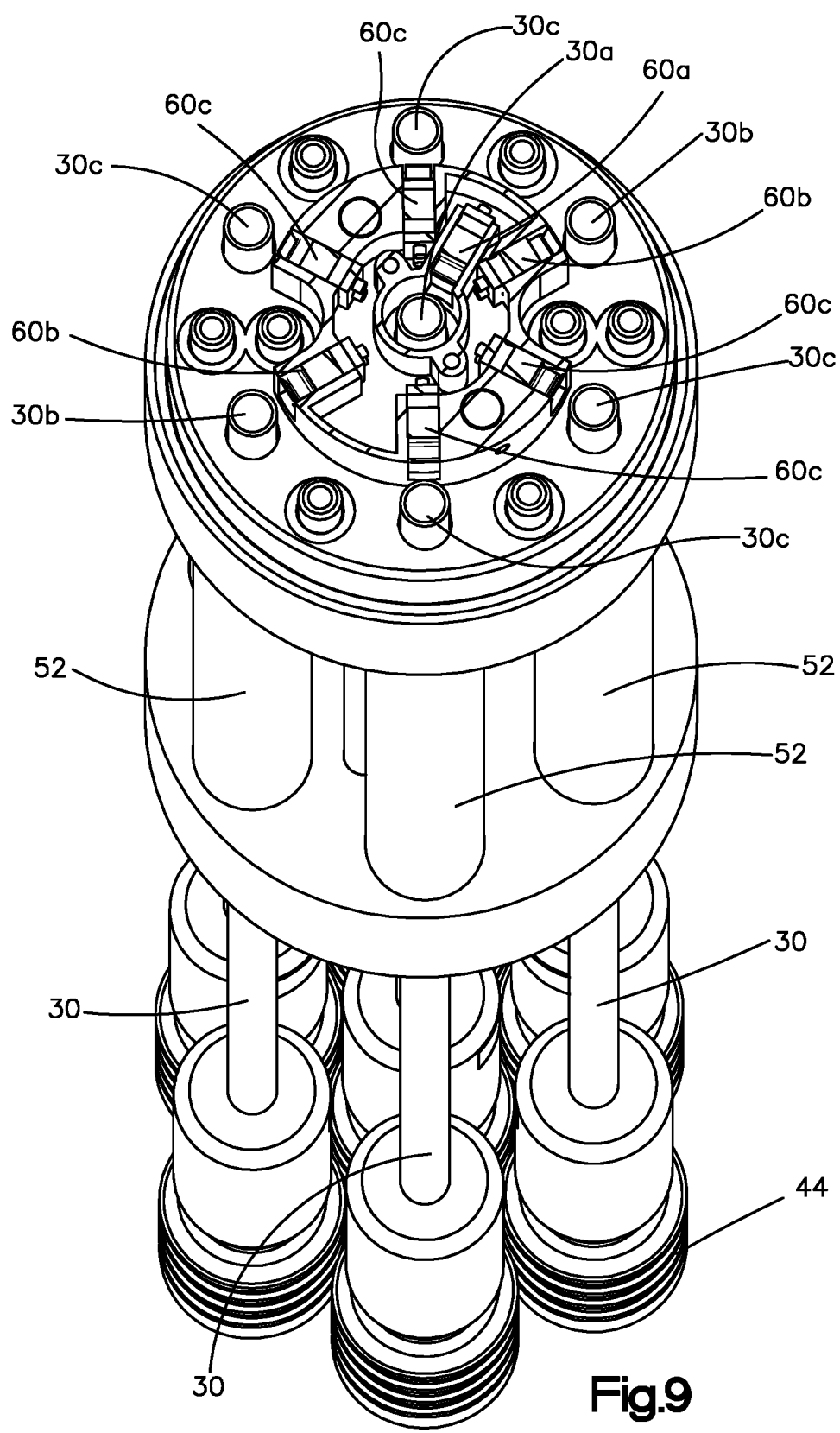
FIG. 9 is a perspective view of the tool with an upper portion of the housing removed for clarity, illustrating the configuration shown in FIG. 1.

Each sensor 60 is positioned to change condition upon the corresponding suction cup reaching its fully extended position. FIG. 9 illustrates the limit switches 60 in the position corresponding to all the suction cup assemblies in their extended position, as illustrated in FIG. 1. Letter designations for the sensors 60 a, b, and c correspond to the letter designations of the corresponding suction cup assembly. Thus, FIG. 9 illustrates each of limit switches 60a, 60b, and 60c in the extended position, as the finger of each limit switch is not in contact with the corresponding suction tube 30.

Figure 10:
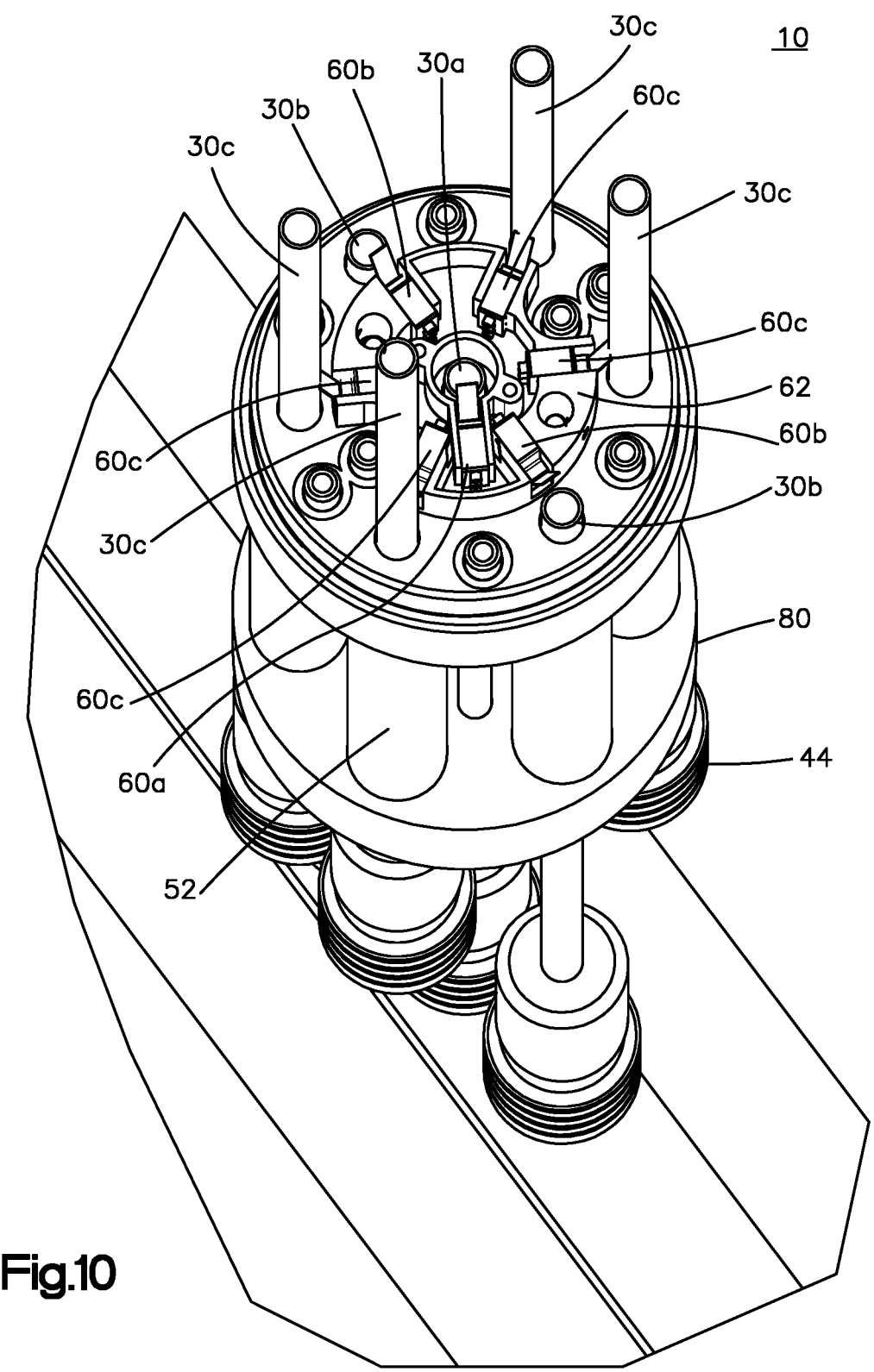
FIG. 10 is a perspective view of the tool with an upper portion of the housing removed for clarity, illustrating the configuration shown in FIG. 3.

FIG. 10 illustrates the limit switch positions corresponding to the orientation of suction cup assemblies 20 illustrated in FIG. 3, in which suction cup assemblies 20a and 20b are in the extended position and other suction cup assemblies 20c are in their retracted position. Limit switches 60a and 60b are in the extended position and limit switches 60c are in the retracted position. In other words, the extended position of switches 60a and 60b correspond to the suction tubes 20a and 20b moving out of engagement with the corresponding limit switch 60a and 60b. The retracted position of switches 60c correspond to the suction cup tubes 30c displacing the spring-loaded finger of limit switches 60c. The change in condition of the limit switch is interpreted by the control system to indicate the extended position of suction tubes 20a and 20b and the retracted position of suction tubes 20c. For the configuration illustrated in FIG. 2, only center limit switch 60a is in the extended position (not shown in the figures).

In operation, arm 8 positions end-of-arm tool 10 at a desired position relative to the item to be grasped. Various methods of positioning tool 10 may be employed, as understood by persons familiar with robotic grasping tools in view of the present disclosure. As desired, tool 10 may have the configuration illustrated in any one of FIGS. 1-3 and the opposite orientation to that shown in FIG. 2.

For example, for the configuration of tool 10 illustrated in FIG. 3, the extended suction cup assemblies 20a and 20b are the leading points of tool 10. When tool 10 engages an item, the bellows 44 of assemblies 20a and 20b contact the item. The force or inertia or tool 10 moving toward the item applied a longitudinal force to suction cup assemblies 20a and 20b, which displaces suction cup assemblies 20a and 20b distally or in a retracted direction.

The displacement of the assemblies 20a and 20b displaces piston 54 against the air pressure on the proximal side 56p. Upon the displacement, the proximal end of suction tube 30 moves upwardly to retract or actuate the limit switch. Tool 10 may be moved into contact with the item at relatively high speed (that is, compared with the speed of a tool without feedback upon contact), as the signal from the limit switch 60 enables the control system to quickly modify or stop the motion of arm 8 based on the contact signal.

Upon contact, the vacuum pressure within suction cup bellows 44 grasps the item, and arm 8 may transport the item to the desired location and discharge it by switching off the vacuum pressure. In this regard, a vacuum supply (not shown in the figures) that supplies vacuum pressure to plenum 72 (as shown for example in FIG. 6), which halts the vacuum provided to each one of the suction cup assemblies to release the item from tool 10. Other control sequences are contemplated, such as (without limitation) modulating the pneumatic pressure during engagement of item in either or both of the extended (that is, engaged) suction cup assemblies and the retracted suction cup assemblies, as desired.

If desired, the extended suction cup assemblies 20 are retracted by supplying pneumatic pressure to the distal manifold 82 via retract tube 78. The common connection of the distal ends of actuator tubes 52 via manifold 82 enables all the suction tubes 30 to be retracted simultaneously.

The desired configuration of tool 10 can be achieved according to the control system information about the weight, size, and orientation of the item, as well as information about the extent that the item is covered or partially covered by obstacles, such as other items, sidewalls of a tote or gaylord, and the like. Each actuator 50 has its own, independently controlled pneumatic air, as each actuator tube has a dedicated source of pneumatic air that is not common to other pneumatic air sources. Valves (not shown in the figures) enable independent control of the pneumatic air.

In the embodiments in the figures, the suction cup assemblies are grouped together into rings. The present invention is not limited to a ring configuration, as preferably each suction cup assembly has its own actuator such that the suction cup assemblies can each be actuated individually or on groups chosen for the particular needs of the application. Further, a bellows type suction cup is used to illustrate aspects of the present invention, and the invention encompasses any other type of suction cup. A specific supply of pneumatic air and vacuum pressure are described, and the present invention is not intended to be limited to any particular air and/or vacuum supply unless expressly recited in the claims.

The position and orientation of the end effector may be controlled through instructions from the control system. Specifically, the control system may receive input from a human operator and/or a grasp planning program so as to employ custom grasping strategies for various shapes of items. For example, in relation to suction-type end effectors, six-sided boxes with planar surfaces and no label may require only simple grasping strategies regardless of size and orientation. But items with more complex surfaces may be difficult to grasp, especially if these items are disposed in close proximity to other items and objects, such as when multiple items are disposed in a storage container such as a gaylord.

In some embodiments, the control system may receive data from one or more sensors (for example, optical, contact, proximity, etc.) disposed on and/or around the end effector. This data will be used by the control system to determine surface shapes of the item and objects near the item. Alternatively, or additionally, the control system may receive data from a database of known item types. For example, data of known item types may describe the item using two or higher dimensional images and/or modes of the item, attributes of the item (e.g., dimensions, weights, center of gravity, etc.), and/or features associated with surfaces of the item (e.g., a surface label, surface or material characteristics, etc.). A two-dimensional image of the item showing a feature may allow an identification of a respective surface. If the two-dimensional image (or a plurality thereof) shows multiple features, relative distances, positions, and orientations of these features may be determined. Generated two dimensional images of an item may be mapped to a multi-dimensional model that enables the control system to determine the relative position and orientation of the item in three-dimensional space. Alternatively, or additionally, the control system may receive data from one or more sensors (for example, optical, contact, proximity, etc.) in a scan tunnel disposed upstream of the end effector.

Alternatively, or additionally, the control system may receive data indicating grasping strategies that have been successful or unsuccessful for the same or similar items and/or item configurations in the past. Success data may be based on a specific end effector and/or a specific type of end effector and/or data related to the position and orientation of the end effector in relation to the items and item configurations. For example, the control system for the end effector may receive success data from the end effector itself, as well as other end effectors with the same or similar design. The known item data may also describe the applied manipulations (e.g., a list of the actions including grasping, moving, retrieving, etc.), related manipulation parameters (e.g., type and amount of force, pressure, voltage, and/or current applied, orientation of an item, etc.), and successes and failures of the applied manipulations (e.g., whether grasping an item was successful, damages resulting from using particular manipulations, end effectors, or forces, etc.).

The control system may receive input from a human and/or from one or more sensors regarding which, of two successful grasping strategies, is a better grasp. The control system may employ other data inputs, as well. The control system may employ machine learning on the received data to determine an initial grasping strategy. If unsuccessful, the control system may provide a second grasping strategy based, at least in part, on the data that the initial grasping strategy was unsuccessful. Once a successful grasping strategy is determined, the control system will save to the database data related to the successful strategy for future use by the specific end effector and other end effectors grasping the same or similarly shaped items.

In some embodiments, the robotic manipulation system is able to employ other end effectors having different structural profiles if the first grasping strategy using the first end effector is unsuccessful. The control system can receive success data regarding multiple end effectors, including input from a human and/or from one or more sensors (for example, optical, contact, proximity, etc.) regarding which, of two successful grasping strategies, is a better grasp. The control system will save to the database data related to strategies for grasping when multiple end effectors are available for future use by the specific end effector and other end effectors grasping the same or similarly shaped items.

Data used and gathered by the control system may be exchanged over one or more networks. The networks may include a public data network (e.g., the Internet) and a private data network (e.g., an intranet or a virtual private network (VPN)), wireless or wired, and implementing different communication protocols (e.g., TCP/IP). The network may connect to the specific robotic arm on which the end effector is disposed, as well as other robotic arms.

The EOAT structure and function are described herein by referring to advantages and specific examples or embodiments. The present invention is not limited to the advantages explained herein, nor to the structure or function of the examples or embodiments. For merely one example, the problem of inadvertent removal of labels or deformation of films during handling is explained, and the application of the button can improve the function cups in this regard. However, the structure and function of the present invention is not limited to addressing the label or resilient film issues. Moreover, the text is intended to describe the specific embodiments shown in the figures. The structure and function shown and described is intended only for example. For non-limiting examples, the location and types of seals, the location of corresponding parts and their movements, and the function descriptions are not intended to limit the scope of the invention. Rather, it is intended that the invention be given the full scope of the plain meaning of the claims.

What is claimed:

1. An end-of-arm tool for a robotic arm having displacement feedback, the tool comprising:
    a moveable housing adapted to be positionable by the robotic arm;
    multiple suction cup assemblies coupled to and positionable with the housing and adapted to grasp and move an item, the suction cup assemblies being configured in a 2D pattern;
        each one of the suction cup assemblies comprising a suction tube, a suction cup at a distal end of the suction tube, and a pneumatic actuator adapted for alternately extending and retracting the suction tube;
    a distal manifold that is adapted for transmitting pneumatic pressure to a piston housing on a distal side of a piston of each one of the suction cup assemblies;
    a sensor for each one of the suction cup assemblies adapted to indicate engagement by the suction cup assembly with the item;
    wherein each one of the suction cup assemblies is configured to extend and retract independently of other ones of the suction cup assemblies, the suction cup assemblies extending as desired according to the shape of the item to be grasped; and
    whereby a signal from the sensors indicates engagement with the item by the suction cup assembly.

2. The end of arm tool of claim 1 wherein:
    the 2D-pattern of suction cup assemblies includes at least one concentric ring,
    each one of the suction cup assemblies is displaceable from its fully extended position upon contact with the item to be grasped, and
    the sensor is capable of detecting displacement of the suction cup assembly from the fully extended position.

3. The end of arm tool of claim 1 wherein the suction cup assemblies are configured to grasp the item for transport of the item from a first location to a second location and to discharge the item at the second location.

4. An end-of-arm tool system, the system comprising:
    a robotic arm configured to be moveable in response to a control signal; and
    an end-of-arm tool comprising:
        a housing coupled to the robotic arm; the housing including a distal manifold;
        multiple suction cup assemblies configured in a 2D-pattern, each suction cup assembly including a suction tube, a suction cup at a distal end of the suction tube, and a pneumatic actuator adapted for alternately extending and retracting the suction tube, the pneumatic actuator including a piston in a piston housing, the piston being adapted for movement within the piston housing in response to air pressure differential across the piston; the distal manifold being adapted for transmitting air pressure to the piston housing on a distal side of the piston of each one of the suction cup assemblies; and
        an array of sensors, each one of the suction cup assemblies being associated with a corresponding one of the sensors such that each one of the sensors indicate engagement of a corresponding one of the suction cup assemblies with an item to be grasped;
        whereby when any of the suction cup assemblies are in a fully extended position, contact by the suction cup with the item is capable of displacing the suction cup assembly from the fully extended position, and the sensor is capable of detecting displacement of the suction cup assembly from the fully extended position to indicate contact with the item, and
        whereby the suction cup assemblies are configured to grasp the item to enable the robotic arm to lift and transport the item from a first location to a second location and to discharge the item at the second location.

5. The system of claim 4 wherein the 2D-pattern is one or more concentric rings of suction cup assemblies around a center suction cup assembly.

6. The system of claim 4 wherein each one of the suction cup assemblies is capable of being actuated to and from its fully extended position independently of other ones of the suction cup assemblies.

7. The system of claim 4 wherein each one of the suction cup assemblies is displaceable from its fully extended position upon contact with the item, and the sensor detects displacement of the suction cup assembly from the fully extended position.

8. The system of claim 7 wherein each sensor is at least one of a limit switch and a proximity sensor that is fixed at a location relative to the housing near a proximal end of the suction tube in its fully extended position.

9. The system of claim 4 wherein the piston housing of each one of the suction cup assemblies is fixed to the housing.

10. The system of claim 9 wherein the suction tube is attached to a piston of the actuator, whereby translation of the piston translates the suction cup to and from the fully extended position.

11. The system of claim 4 further comprising a retract tube extending from a proximal portion of the housing to the distal manifold and adapted for supplying pneumatic pressure to the piston housing on the distal sides of the piston.

12. The system of claim 11 wherein the distal manifold connects distal ends of the piston housing of each one of the suction cup assemblies together such that the suction cup assemblies are adapted to be retracted together.

13. The system of claim 4 further comprising a valve and control system to provide pneumatic pressure independently to the piston housing of each one of the suction cup assemblies on a proximal side of the piston, whereby pneumatic pressure on the proximal side of the piston drives the suction tube toward the fully extended position.

14. The system of claim 4 wherein communication of vacuum pressure between the suction tube and an interior of the suction cup is continuous via an aperture without a valve.

15. A method of picking an item, the method comprising:
    positioning the system of claim 4 relative to the item and extending at least one of the suction cup assemblies to the fully extended position;
    sensing the fully extended position of the at least one fully extended suction cup assembly;
    contacting the item with the at least one fully extended suction cup assembly and displacing the at least one fully extended suction cup assembly; and
    after the displacing step, sensing said displacement to indicate contact of the at least one fully extended suction cup assembly with the item; and
    after the contacting step, lifting the item and transporting the item to a desired location.

16. The method of claim 15 wherein the sensing step is performed on a proximal end of the suction tube.

17. The method of claim 15 wherein the extending step includes supplying pneumatic pressure to a piston housing on a proximal side of a piston to drive the piston and suction tube to the fully extended position.

18. The method of claim 15 further comprising the step of retracting the extended suction cup assemblies by supplying pneumatic pressure to a distal manifold via a retract tube.

* * * * *